(12) United States Patent
Lee (10) Patent No.: US 6,236,432 B1
(45) Date of Patent: May 22, 2001

(54) MPEG II SYSTEM WITH PES DECODER

(75) Inventor: Hyun-Su Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/041,949

(22) Filed: Mar. 13, 1998

(30) Foreign Application Priority Data

Mar. 15, 1997 (KR) .................................................. 97-8844

(51) Int. Cl.$^7$ ................................................... H04N 7/18
(52) U.S. Cl. ................................. 348/240.26; 348/240.28
(58) Field of Search .............................. 348/845.2, 845.3; 382/233; 709/247; 375/240.26, 240.28

(56) References Cited

U.S. PATENT DOCUMENTS 5,684,804 * 11/1997 Baronetti et al. ..................... 348/423
6,016,348 * 1/2000 Blatter et al. ........................ 380/228

* cited by examiner

Primary Examiner—Andy Rao (74) Attorney, Agent, or Firm—Finnegan, Henderson, Farabow, Garrett, & Dunner, L.L.P.

(57) ABSTRACT

MPEG II system is disclosed, in which audio/video data multiplexed and transmitted in a form of program stream or transport stream depending on an ambient of application from a transmitter side is demultiplexed automatically according to the form of the stream at a receiver side for presenting the audio/video data, including a transport stream buffer for storing transport stream data synchronized to a first clock signal in an order of reception if a transport stream is selected from streams received in an ambient with many errors in response to a first control signal, a program stream FIFO buffer for storing program stream data synchronized to a second clock signal in an order of reception if a program data of a storage medium under an ambient without error is selected in response to a second control signal, a PES decoder for decoding elementary streams of audio and video to a PES level on the same time to provide status flags and packet data if the transport stream data or the program stream data provided from the transport stream FIFO buffer and the program FIFO buffer respectively are PES packet data, a PES buffer for storing a PES packet data decoded by the PES decoder, and an audio decoder and a video decoder for restoring the packet data from the PES buffer into original audio and video signals respectively.

7 Claims, 5 Drawing Sheets

MPEG II SYSTEM WITH PES DECODER

BACKGROUND OF THE INVENTION

1. Field of the Invention

The present invention relates to an MPEG II (Motion Picture Expert Group II) system, and more particularly, to an MPEG II system with a PES decoder, in which a software basis program stream and a hardware basis transport stream are demultiplexed irrespective of forms of the streams for restoring a video signal and an audio signal.

2. Description of the Related Art

Recently, different formats are suggested for transferring digitized video and audio signals between media. An MPEG II decoder formats a video compressed data and an audio compressed data for easy transfer of the data between media. There are formats provided for transmission/reception under an ambient in which almost no transmission error occurs, such as storage media, and formats provided form transmission/reception under an ambient in which transmission errors are liable to occur, such as satellite or cable. The format for a transmission/reception devices for the ambient in which almost no transmission error occurs is formed with program streams (hereafter called as "PS"), and the format for a transmission/reception devices for the ambient in which transmission errors are liable to occur is formed with transport streams (hereafter called as "TS"). That is, the PS and the TS has a difference in use of an error correcting code system. In the MPEG II decoder, transport scale data are multiplexed into packets containing audio, video, program specific information and other digital data according to respective preset ratios before transmission.

A background art MPEG II decoder in transmission/reception devices for use in an ambient with possible errors employs either a CPU or a hardwired logic. FIG. 1(a)–(e) illustrate a structure of data produced from a compressed data provided through a video encoder at a transmission side through a PES (Packetized Elementary Stream) packetizing, a PS packetizing, a TS packetizing, and FIG. 2 illustrates a background art MPEG II system at a reception side.

Referring to FIG. 1(a), data after the packetizing in the MPEG II decoder has a structure of an access unit in a form of compressed original video signal provided through an encoder. The access unit is added of information on video (aspect ratio, bit rate and etc.) together with a sequence header, to provide an elementary stream as shown in FIG. 1(b), which is processed through the PES packetizing, to provide a PES header and an appropriate length of the elementary stream. Next, the PES packetized data as shown in FIG. 1c is packetized into a TS having packets each with 188 bytes as shown in FIG. 1d if it is intended to be used in an ambient with error. And, if it is intended to be used in an ambient without error, the PES packetized data as shown in FIG. 1c is packetized into a PS having packs each with one or more PES packets as shown in FIG. 1e.

Figure 2:
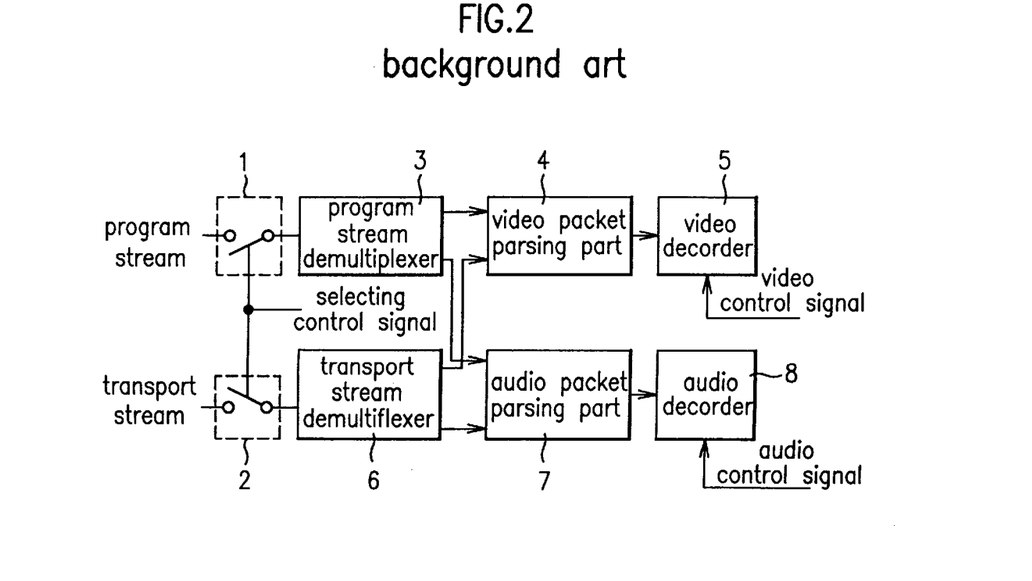
FIG. 2 illustrates a block diagram of a background art MPEG II system.

Referring to FIG. 2, the receiver side MPEG II system is provided with a first switching part 1 for selecting a PS data in a storage medium under an ambient of no error in response to a selecting control signal, a second switching part 2 for selecting a TS data under an ambient with errors, a PS demultiplexer 3 for receiving the PS data from the first switching part 1 and demultiplexing pack headers and system headers, a video packet parsing part 4 for receiving and parsing a PES packet data having pack headers and system headers demultiplexed in the PS demultiplexer 3 and providing an elementary stream to a video decoder 5, the video decoder 5 for receiving the elementary stream from the video packet parsing part 4 and decoding a video signal in response to a video control signal, a TS demultiplexer 6 for receiving the TS data from the second switching part 2 and demultiplexing a transport header, an ADF (Adaptation Field), and a PSI (Program Specify Identifier), an audio packet parsing part 7 for receiving and parsing the PES packet data having the transport header, the ADF and the PSI demultiplexed in the TS demultiplexer 6 and providing to an audio decoder 8, and the audio decoder 8 for receiving and decoding an audio signal received from the audio packet parsing part 7 in response to an audio control signal.

Figure 1:
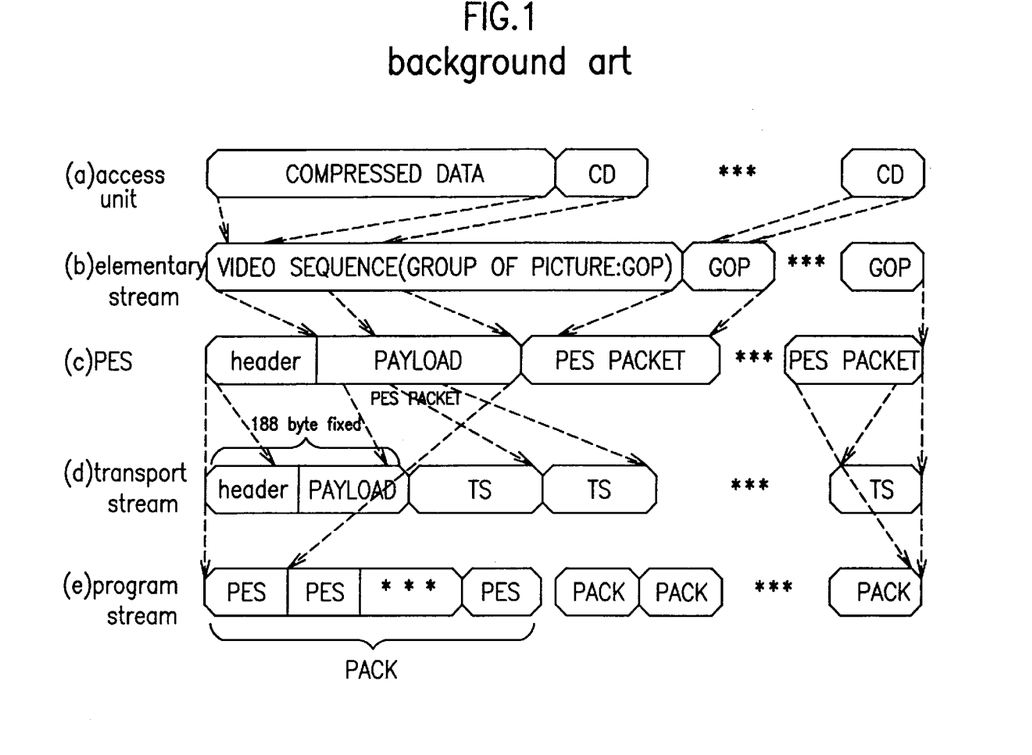

The operation of the aforementioned receiver side MPEG II system will be explained with reference to FIGS. 1 and 2.

In the transmitter side, a video signal is encoded into an access unit, a compressed form of an original signal, through an encoder (see FIG. 1a). The access unit data is added of video related information, together with a sequence header, to provide an elementary stream form of data (see FIG. 1b). Then, the elementary stream is passed through a PES packetizing process (see FIG. 1c), to be provided as a PES packet of an appropriate length in a form of PES header and elementary stream(GOP). Next, depending on an application, the PES packetized data (see FIG. 1c) is either provided as a TS (see FIG. 1d) packetized as transport packets each with 188 bytes for use in ambient with errors, or provided as a PS formed with packs each with one or more PES packets for use in an ambient without error. In this instance, since the PS, data of a storage media under an ambient without error, and the TS, data under an ambient with error, are received continuously, a form of data to be provided finally from the continuously received PS and TS is selected by a user or a controller. Therefore, when the first switching part 1 is turned on in response to a selecting control signal, the PS as shown in FIG. 1(e) is selected and provided to the PS demultiplexer 3. The PS demultiplexer 3 demultiplexes pack headers and system headers in the received PS data and provides the demultiplexed video and audio PES packet data to the video packet parsing part 4 and the audio packet parsing part 7. Then, the video packet parsing part 4 and the audio packet parsing part 7 parse the received PS into video or audio data such as PES headers and provide original elementary streams to the video decoder 5 and the audio decoder 8, respectively. In this instance, the video packet parsing part 4 and the audio packet parsing part 7 parse into PS MAP and PS directory and exchange related data with a host computer (not shown) for detecting an overall system structure of the PES packet. And, when the second switching part 2 is turned on in response to a selecting control signal, the TS as shown in FIG. 1(d) is selected and provided to the TS demultiplexer 6. The TS demultiplexer 6 demultiplexes the received TS data into transport headers, ADF and PSI and provides the demultiplexed video and audio PES packet data to the video packet parsing part 4 and the audio packet parsing part 7. Then, the video packet parsing part 4 and the audio packet parsing part 7 parse the received TS into video or audio data such as PSI and only provide original elementary streams to the video decoder 5 and the audio decoder 8, respectively.

However, each of the PS and TS has a stream of information additional to a program. Therefore, the PS data is further required a process for decoding the PES packets each having PS MAP and PS directory at a PES packet decoder, and the TS data is required a process for decoding the TS additional information presenting in the PSI (Program Specific Information) stream, without fail. Therefore, the background art MPEG II system, which requires a separate decoder for the decoding process, has a limitation for application to current multimedia system which requires a variety of functions, causing problems that a complicated decoding process is required and cost of the MPEG II system becomes expensive due to the additional decoder.

SUMMARY OF THE INVENTION

Accordingly, the present invention is directed to an MPEG II system with a PES decoder that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the MPEG II system includes a transport stream buffer for storing transport stream data synchronized to a first clock signal in an order of reception if a transport stream is selected from streams received in an ambient with many errors in response to a first control signal, a program stream FIFO buffer for storing program stream data synchronized to a second clock signal in an order of reception if a program data of a storage medium under an ambient without error is selected in response to a second control signal, a PES decoder for decoding elementary streams of audio and video to a PES level on the same time to provide status flags and packet data if the transport stream data or the program stream data provided from the transport stream FIFO buffer and the program FIFO buffer respectively are PES packet data, a PES buffer for storing a PES packet data decoded by the PES decoder, and an audio decoder and a video decoder for restoring the packet data from the PES buffer into original audio and video signals respectively.

In other aspect of the present invention, there is provided a PES decoder including a PES state machine for searching a PES packet on completion of decoding by a system header decoder connected to an output bus line of a TS or a PS FIFO buffer, a PES header register for extracting a stream ID when the PES packet is searched at the PES state machine, a stream ID comparator for comparing the stream ID extracted in the PES header register to the stream ID stored in the PES buffer in determining the PES packet stream of being an additional information to a video, an audio, or the program stream, and providing a PES packet formed with a header and a payload to the PES buffer if found being the additional information to the video or audio, and an MAP decoder and a directory decoder each for receiving the additional information to the program stream if determined being the additional information to PS as a result of determination by the stream ID comparator and extracting information required for decoding.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 1(a)–(e) illustrate a data structure after packetizing in a background art MPEG II system;

DETAILED DESCRIPTION OF THE PREFERRED EMBODIMENT

Figure 3:
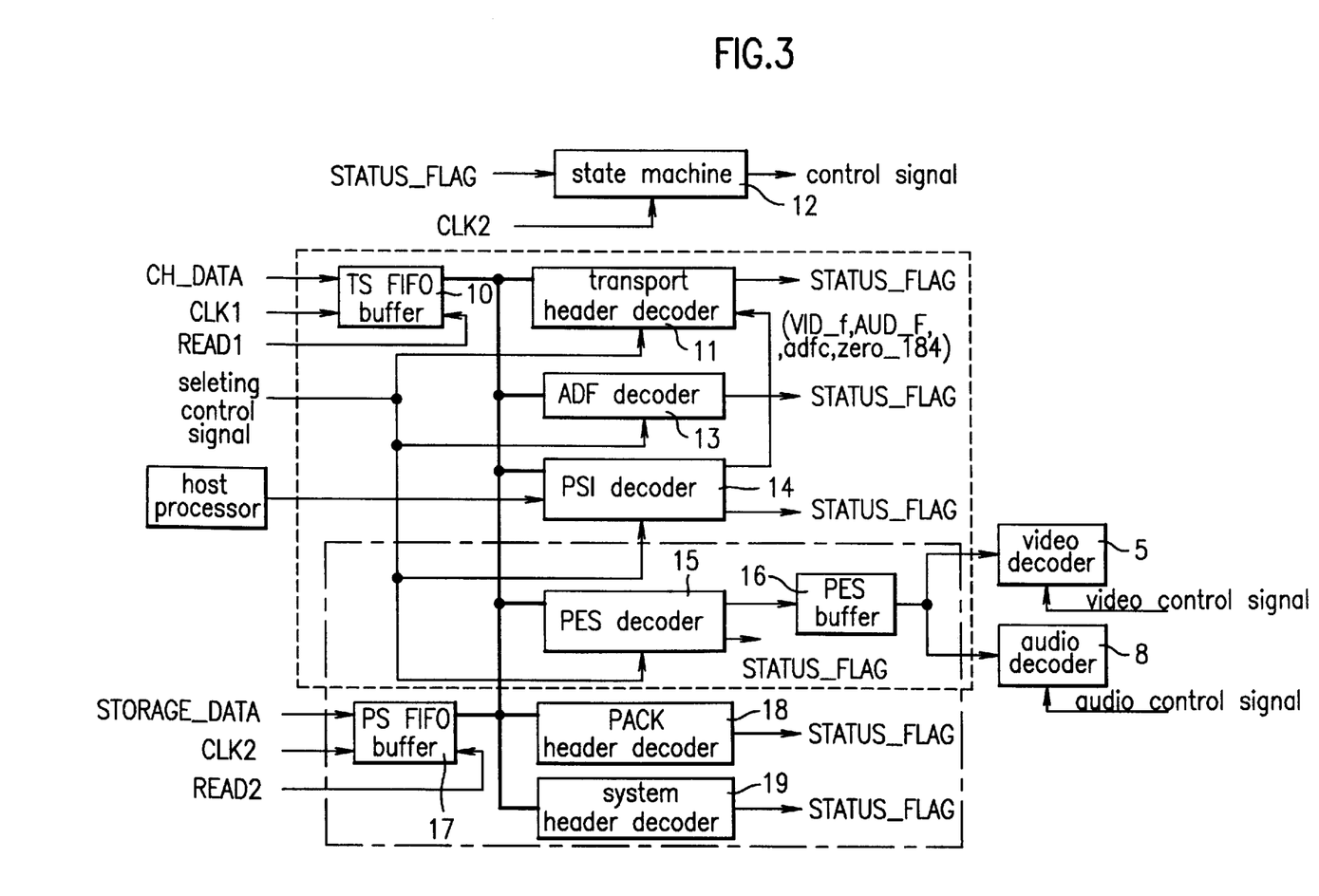
FIG. 3 illustrates a block diagram of an MPEG II system in accordance with a preferred embodiment of the present invention.
Figure 5:
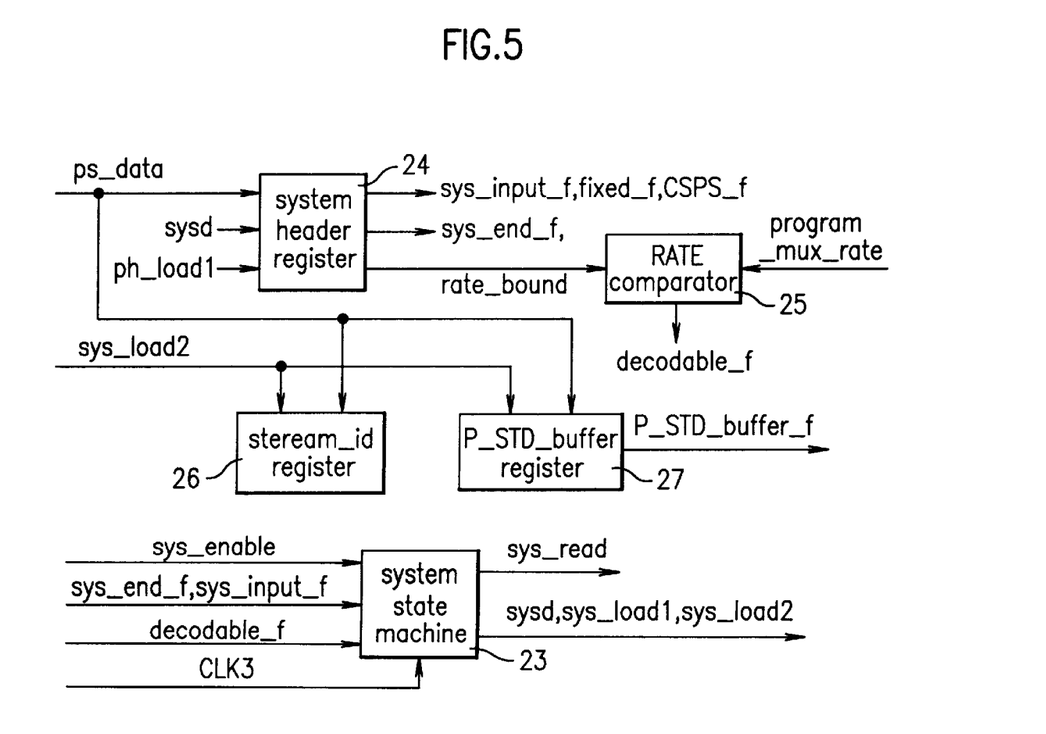
FIG. 5 illustrates a block diagram of the system header decoder shown in FIG. 3.
Figure 6:
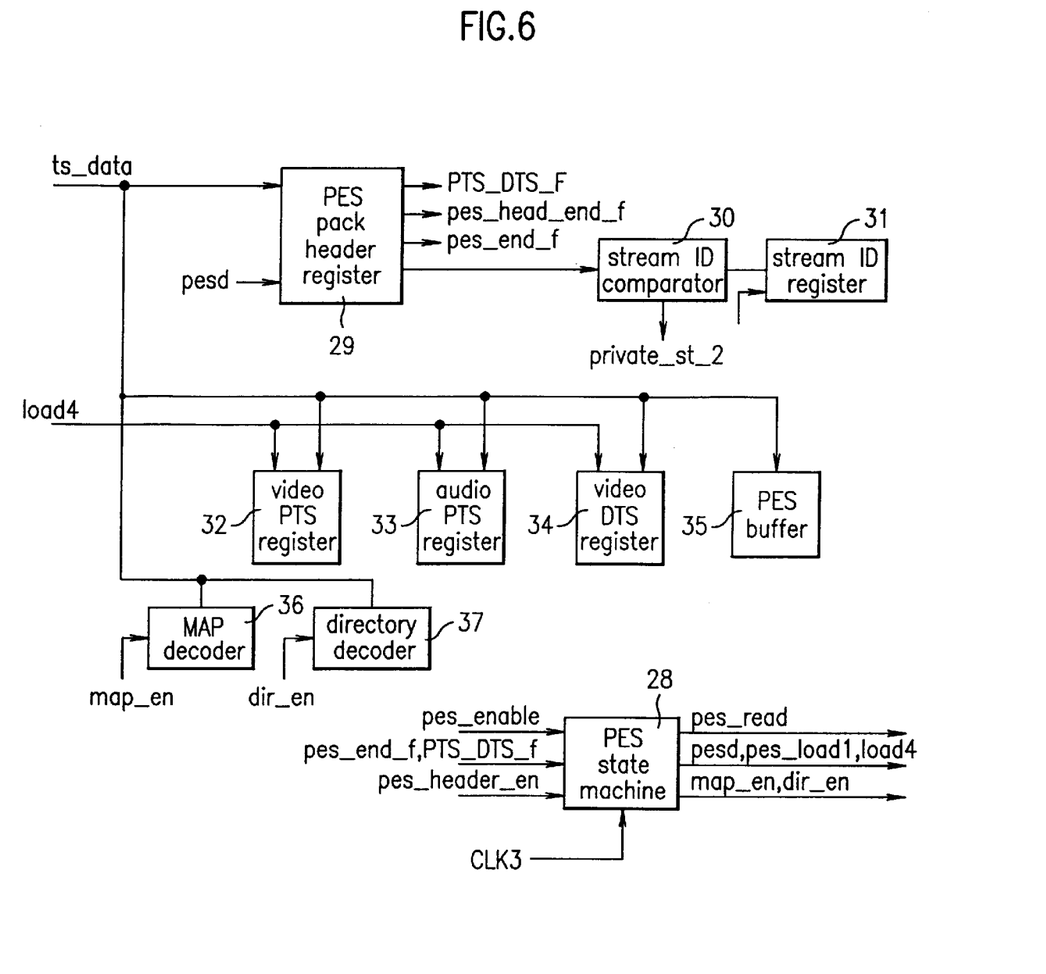
FIG. 6 illustrates a block diagram of the PES decoder shown in FIG. 3.
Figure 7:
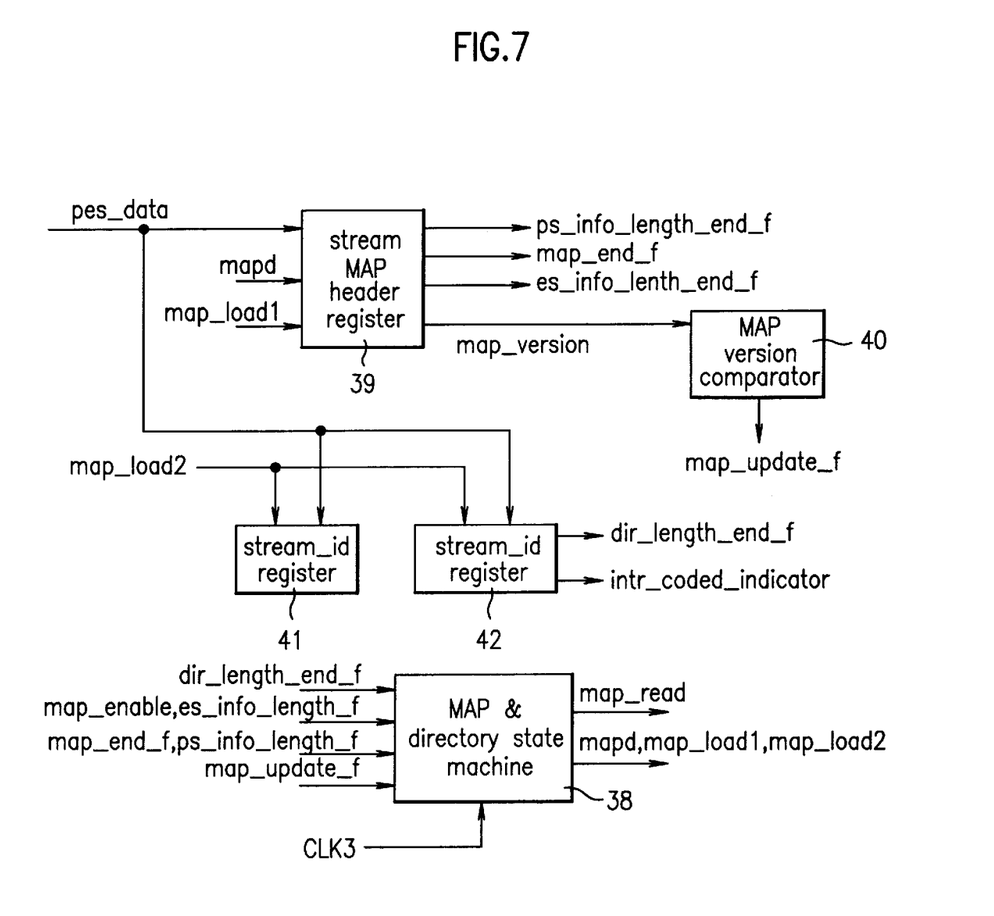
FIG. 7 illustrates the MAP decoder and the directory decoder shown in FIG. 6.

Reference will now be made in detail to the preferred embodiments of the present invention, examples of which are illustrated in the accompanying drawings. FIG. 3 illustrates a block diagram of an MPEG II system in accordance with a preferred embodiment of the present invention, FIG. 4 illustrates a block diagram of the pack header decoder shown in FIG. 3, FIG. 5 illustrates a block diagram of the system header decoder shown in FIG. 3, FIG. 6 illustrates a block diagram of the PES decoder shown in FIG. 3, and FIG. 7 illustrates the MAP decoder and the directory decoder shown in FIG. 6.

Referring to FIG. 3, the MPEG II system in accordance with a preferred embodiment of the present invention includes a TS FIFO buffer for storing TS data synchronized to a first clock signal CLK1 in an order of reception when the TS is selected by a selecting control signal, a transport header decoder 11 for determining the data stored in the TS FIFO buffer 10 of being a user selected data or being a data received in response to a PID (Packet Identifier) for a requirement of one controller and providing a status flag indicating a form of the data and a status flag indicating presence of an ADF to a state machine 12, the state machine 12 for receiving the status flags from the transport header decoder 11 and providing various forms of read signals and control signals to respective decoders and processing a fixed 188 bytes if found the flags of not required data and driving the transport header decoder 11 according to the status flags if found the flags of required data, an ADF decoder 13 for re-detecting presence of status flags in the transport header decoder 11 and generating a status flag for extracting a PCR (Program Clock Reference) in response to an ADF control signal if found the flags of required data, a PSI decoder 14 for selecting a channel according to a PID or exchanging received program information with a host processor, and a PES buffer 16 for decoding an elementary stream for an audio or video to a PES level by the PID when the PCR is provided from the ADF decoder 13.

The MPEG II system in accordance with a preferred embodiment of the present invention further includes a PS FIFO buffer 17 for storing PS data synchronized to a second clock signal CLK2 in an order of reception when the PS is selected in response to an external selecting signal, a pack header decoder 18 for receiving TS data or PS data until reception of a 32 bit pack header from a received stream, decoding an SCR (System Clock Reference) when the pack header is received and synchronizing entire system clock, and determining presence of a system header with reference to a length of the pack header upon completion of the pack header decoding, and a system header decoder 19 for searching for the system header during the pack header decoder 18 carries out a decoding and checking the PS data of being received at a decodable data rate.

Figure 4:
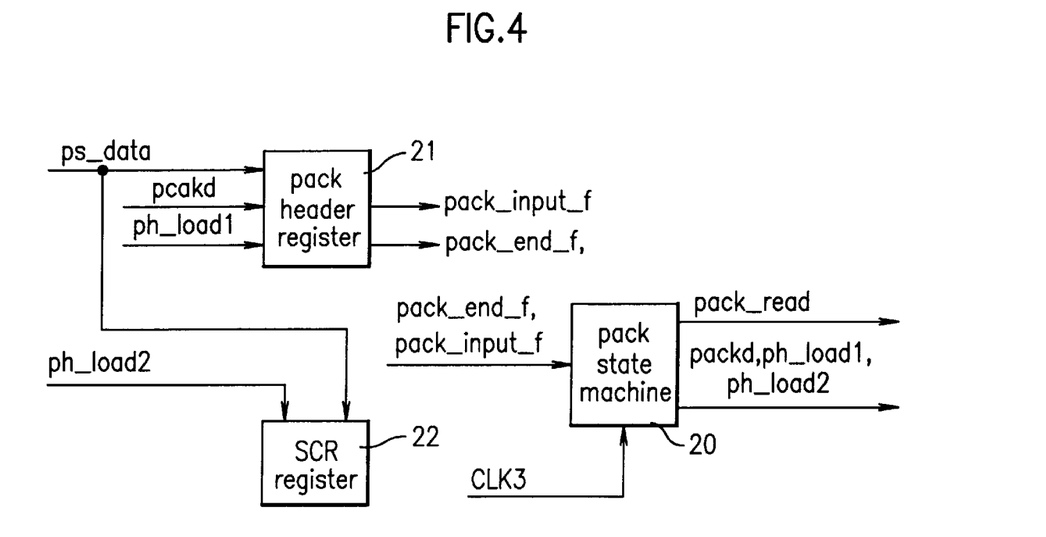
FIG. 4 illustrates a block diagram of the pack header decoder shown in FIG. 3.

FIG. 4 illustrates a block diagram of the pack header decoder 18 shown in FIG. 3, including a pack state machine 20 for extracting a pack header from a PS data ps_data received and generating control signals for loading data and reducing a pack length, a pack header register 21 for detecting a mux rate mux_rate and stuffing of a received program stream, and an SCR register 22 for detecting an SCR (System Clock Reference) for synchronizing a system clock of the decoder 18 to the encoder.

FIG. 5 illustrates a block diagram of the system header decoder 19 shown in FIG. 3, including a system state machine 23 for searching a system header in response to a synchronous enable signal sys-enable generated when a PS data ps_data is received and a pack header length is determined at the pack header decoder 18 and generating a system read signal and a system load signal, a system header register 24 for detecting a system header length and a rate bound rate_bound when the system read signal sys_read and the system load signal sys_load1 or sys_load2 are provided from the system state machine 23, a rate comparator 25 for comparing the system header length and the rate bound detected at the system header register 24 to a program multiplexer rate program_mux_rate in determining a program stream decoder (not shown) of being able to decode and providing different status flags to the system state machine 23 using a length reducing signal from the system state machine 23, a stream ID register 26 for extracting information related to buffering of each received stream, and a program stream buffer register 27 for detecting data stored in a program stream buffer (not shown) and providing the detected information to the host computer.

FIG. 6 illustrates a block diagram of the PES decoder 15 shown in FIG. 3, including a PES state machine 28 for searching a PES packet on completion of decoding by the system header decoder 19, a PES header register 29 for extracting a stream ID when the PES packet is searched at the PES state machine 28, a stream ID comparator 30 for receiving the stream ID extracted at the PES header register 29, comparing the stream ID to the stream ID data stored in the PES buffer 35 in determining the PES packet stream of being a video, an audio, or an additional information to the PS, and providing a PES packet formed with a header and a payload to the PES buffer 35 if found being a data on the video or audio, and an MAP decoder 36 and a directory decoder 37 each for receiving the additional information to PS if determined being the additional information to PS as a result of determination by the stream ID comparator 30 and extracting required information. The unexplained reference numerals 31 denotes a stream ID register, 32 denotes a video PTS register, 33 denotes an audio PTS register, and 34 denotes a video DTS register.

FIG. 7 illustrates both the MAP decoder 36 and the directory decoder 37 shown in FIG. 6 each including a MAP directory state machine 38 for detecting each packet received, a stream MAP header register 39 for extracting an MAP header and providing an MAP version if a signal detected at the MAP & directory state machine 38 is a stream packet, an MAP version comparator 40 for receiving the MAP version from the stream MAP header register 39 and comparing to a version stored already for providing an updated MAP stream if found the version has been renewed. The unexplained reference numerals 41 and 42 are stream ID registers.

The operation and advantages of the MPEG II system with a PES decoder of the present invention will be explained.

Referring to FIG. 3, when a TS selecting control signal is provided to the MPEG II system by a user or a controller, to select a TS data, the TS FIFO buffer 10 is enabled in response to a first read signal READ1. Then, the TS data is synchronized to the first clock signal CLK1 and stored in the TS FIFO buffer 10 in an order of reception. In this instance, in response to a control signal, the transport header decoder 11 determines the TS data of being a user selected stream data or a data provided by the PID(Packet Identifier) according to application and provides a status flag STATUS_FLAG indicating a form of the received data and a status flag indicating presence of the ADF (Adaptation Field) in the packets to the state machine 12. The state machine 12 then provides a first read signal READ1 and other control signal to a relevant decoder if the received status flags are of not required data, to process a fixed amount of data(188 bytes) and enables the transport header decoder 11, again. The transport header decoder 11 detects presence of a required data, to generate an ADF control signal, if the required data is present, to enable the ADF decoder 13 for extracting a PCR (Program Clock Reference). Since a TS data is also provided to the PSI decoder 14 or the PES decoder 15 upon reception of a PID when the PCR is extracted through the ADF decoder 13, the PSI decoder 14 selects a channel or exchanges program information with the host processor and the PES decoder 15 decodes an elementary stream of audio and video to a PES level and stores in the PES buffer 16, allowing the video decoder 5 and the audio decoder 8 for easy decodings of received transport streams.

In the meantime, when a PS selecting control signal is provided to the MPEG II system to select a PS data, the PS FIFO buffer 17 is enabled to store PS data in an order of reception synchronized to the second clock signal CLK2. In this instance, as the pack header decoder 18 selects no channel because the received PS data has one channel and one time base, the pack header decoder 18 is provided with the PS data until a 32 bit pack header is provided from a received stream. Thereafter, upon reception of a pack header, the MPEG II system decodes an SCR (System Clock Reference) to synchronize the entire system clock and determines presence of a system header with reference to a pack header length after completion of decoding by the pack header decoder 18. If the system header is present as a result of the determination, the MPEG II system searches for the system header through the header decoder 18 and checks if the PS data is received at a decodable data rate. The pack header decoder 18 extracts a pack header from the PS data received through the pack state machine 20 as shown in FIG. 4 and provides control signals which reduce a data load and a pack length. The pack header register 21 detects a mux rate mux_rate, stuffing and etc., of a received stream and detects an SCR for synchronizing a system clock of the decoder 18 to the encoder through the SCR register 22.

In the meantime, as shown in FIG. 5, the system header decoder 19 synchronizes the system state machine 23 by means of the system enable signal sys_enable generated according to the length determination by the pack header decoder 18 upon reception of the PS data, and the system state machine 23 searches the system header to provide a data read signal and a register load signal. In this instance, the system header register 24 detects a header length and a rate bound and the like in response to the system load signal provided from the system state machine 23. And, the rate comparator 25 compares the detected header length and the rate bound to a program multiplexer rate program_mux_rate, for determining decoding by the PES decoder 15. The system state machine 23 also provides different status flags using a length reducing signal and etc. And, the stream ID register 26 extracts buffering information of each received stream and the PS buffer register 27 detects data stored in a program state buffer (not shown), for providing to the host processor. Then, the host processor controls buffering of the received stream using the buffering information on each stream.

Referring to FIG. 6 which shows a detail system of the PES decoder 15, when the system header decoder 19 finishes decoding, the PES decoder 15 is enabled. The PES state machine 28 searches for a PES packet header upon reception of a PES enable signal pes_enable. The PES header register 29 extracts a stream ID, and the stream ID comparator 30 compares the extracted stream ID to the stream ID data stored in the PES buffer 35 and determines a PES packet stream of being a video, audio or additional information to the PS. If found being video or audio as a result of the determination of the stream ID comparator 30, the PS data is stored in the PES buffer 35 from the header to the payload by a PES packet unit. In this instance, the stream ID comparator 30 can extract and use a required additional information by providing the PS data to the MAP decoder 36 or the directory decoder 37.

FIG. 7 illustrates detailed system both of the MAP decoder 36 and the directory decoder 37. Upon reception of a PS MAP or a directory packet, the MAP/directory state machine 38 detects a relevant packet for a received signal. If found the packet being a PS MAP packet as a result of the packet detection, the stream MAP header register 39 extracts a relevant data for the received packet and provides to the MAP version comparator 40. Then, the MAP version comparator 40 compares the received data to a stored version, for extracting the stream if a previous version has been renewed and removing a remained data if the previous version has not been renewed. And, if found a reception of a directory stream as the result of detection by the MAP & directory state machine 38, after extracting a PTS (Presentation Time Stamp) value and a coding indicator from each elementary stream containing the PS data, the PS data is provided to the audio decoder 8 or the video decoder 5 for a regular decoding.

As has been explained, since the MPEG II system with a PES decoder allows decoding of various formats of data stored in a compact disc, a storage medium in a multimedia application, by means of the MPEG II system decoder of the present invention without any additional device, a product reliability can be improved.

It will be apparent to those skilled in the art that various modifications and variations can be made in the MPEG II system with a PES decoder of the present invention without departing from the spirit or scope of the invention. Thus, it is intended that the present invention cover the modifications and variations of this invention provided they come within the scope of the appended claims and their equivalents.

What is claimed is:

1. An MPEG II system, comprising:
   a transport stream buffer for storing transport stream data synchronized to a first clock signal in an order of reception if a transport stream is selected from streams received in an ambient with many errors in response to a first control signal;
   a program stream first in first out (FIFO) buffer for storing program stream data synchronized to a second clock signal in an order of reception if a program data of a storage medium under an ambient without error is selected in response to a second control signal;
   a packetized elementary stream (PES) decoder for decoding elementary streams of audio and video to a PES level on the same time to provide status flags and packet data if the transport stream data or the program stream data provided from the transport stream FIFO buffer and the program stream FIFO buffer respectively are PES packet data;
   a PES buffer for storing a PES packet data decoded by the PES decoder; and
   an audio decoder and a video decoder for restoring the packet data from the PES buffer into original audio and video signal respectively.

2. An MPEG II system as claimed in claim 1, wherein the PES decoder decodes either the program stream data or the transport stream data.

3. An MPEG II system as claimed in claim 1, wherein an output terminal of the transport stream FIFO buffer and the program stream FIFO buffer is connected to an input terminal of the PES decoder with one pipe line.

4. An MPEG II system as claimed in claim 1, further comprising:
   a pack state machine for extracting a pack header from a received program stream and providing control signals for data loading and reducing a pack length;
   a pack header register for detecting a multiplexer rate, MUX_RATE, and stuffing of a received program stream; and
   an SCR register for detecting an SCR(System Clock Reference) synchronized to a system clock of the PES decoder.

5. An MPEG II system as claimed in claim 1, further comprising:
   a system header decoder comprising:
      a system state machine for searching a system header in response to a synchronous enable signal, sys-enable, generated when a program stream is received or a pack header length is determined at the pack header decoder and generating a data read signal and a register load signal;
      a system header register for detecting a header length and a rate bound, rate_bound, of the program stream when the data read signal and the register load signal are provided from the system state machine;
      a rate comparator for comparing to a rate of a program multiplexer received when a detecting signal is provided from the system header register in determining whether the program stream is capable of being decoded and providing different status flags to the system state machine using a length reducing signal from the system state machine;
      a stream identification (ID) register for extracting information related to buffering of each received stream; and
      a program stream buffer register for searching kinds of data stored in a program stream and providing the searched kind of data to the host computer.

6. A packetized elementary stream (PES) decoder, comprising:
   a PES state machine for searching a PES packet on completion of decoding by a system header decoder connected to an output bus line of a transport stream (TS) or a program stream (PS) first in first out (FIFO) buffer;

a PES header register for extracting a stream identification (ID) when the PES packet is searched at the PES state machine;

a stream ID comparator for comparing the stream ID extracted in the PES header register to the stream ID stored in the PES buffer in determining whether the PES packet stream is an additional information to a video, an audio, or the program stream, and providing a PES packet formed with a header and a payload to the PES buffer if found being the additional information to the video or audio; and a MAP decoder and a directory decoder each for receiving the additional information to the program stream if determined being the additional information to PS as a result of determination by the stream ID comparator and extracting information required for decoding.

7. A PES decoder as claimed in claim 6, wherein the MAP decoder and the directory decoder each further comprising:

a MAP and directory state machine for detecting each packet received;

a stream MAP register for extracting packet information and a length data if a signal detected in the MAP and directory state machine is a PS MAP packet; and a MAP version comparator for receiving the MAP version, map_version, from the stream MAP register and comparing to a version stored previously for providing an updated MAP stream only when the version has been renewed from a previous version.

* * * * *